United States Patent
Gharavi-Alkhansari et al.

(10) Patent No.: US 8,922,671 B2
(45) Date of Patent: Dec. 30, 2014

(54) METHOD OF COMPRESSION OF IMAGES USING A NATURAL MODE AND A GRAPHICS MODE

(71) Applicant: Sony Corporation, Tokyo (JP)

(72) Inventors: Mohammad Gharavi-Alkhansari, San Jose, CA (US); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 75 days.

(21) Appl. No.: 13/793,089

(22) Filed: Mar. 11, 2013

(65) Prior Publication Data

US 2014/0253751 A1 Sep. 11, 2014

(51) Int. Cl.
*H04N 5/228* (2006.01)
*G06T 9/00* (2006.01)

(52) U.S. Cl.
CPC .................... *G06T 9/00* (2013.01)
USPC ....................................... 348/222.1

(58) Field of Classification Search
USPC ................... 348/221.1, 237; 375/240.24
See application file for complete search history.

(56) References Cited

U.S. PATENT DOCUMENTS

| 5,585,944 | A | 12/1996 | Rodriguez |
| 6,891,969 | B2 | 5/2005 | Revill |
| 8,248,668 | B2 * | 8/2012 | Sakai ................. 358/426.02 |
| 2008/0131087 | A1 * | 6/2008 | Lee et al. ................. 386/112 |
| 2010/0309984 | A1 * | 12/2010 | Liu et al. .............. 375/240.24 |
| 2010/0322597 | A1 * | 12/2010 | Gharavi-Alkhansari et al. ...................... 386/328 |
| 2011/0064131 | A1 | 3/2011 | Park et al. |
| 2012/0155780 | A1 | 6/2012 | Van Der Vleuten |

OTHER PUBLICATIONS

Said, Amir "Compression of Compound Images and Video for Enabling Rich Media in Embedded Systems", HP Laboratories, Palo Alto, CA May 11, 2004, pp. 1-14.

* cited by examiner

*Primary Examiner* — Aung S Moe
*Assistant Examiner* — Amy Hsu
(74) *Attorney, Agent, or Firm* — Haverstock & Owens LLP

(57) ABSTRACT

A method of and system for compression of images and video, with random access capability are described herein. Before encoding, the image is partitioned into blocks. The pixels in each block are grouped into several groups using thresholds such that a single value is stored in each group.

24 Claims, 16 Drawing Sheets

|    | Gp1 | Gp2 | Gp3 | Gp4 |
|----|-----|-----|-----|-----|
| 1  |     |     |     |     |
| 2  | X   |     |     |     |
| 3  |     | X   |     |     |
| 4  |     |     | X   |     |
| 5  |     |     |     | X   |
| 6  | X   | X   |     |     |
| 7  | X   |     | X   |     |
| 8  | X   |     |     | X   |
| 9  |     | X   | X   |     |
| 10 |     | X   |     | X   |
| 11 |     |     | X   | X   |
| 12 | X   | X   | X   |     |
| 13 | X   | X   |     | X   |
| 14 | X   |     | X   | X   |
| 15 |     | X   | X   | X   |
| 16 | X   | X   | X   | X   |

Fig. 7

|   | Gp1 | Gp2 | Gp3 | Gp4 | |
|---|---|---|---|---|---|
| 1 | | | | | not possible |
| 2 | X | | | | the block has exactly 1 color in it (OK) |
| 3 | | X | | | not possible |
| 4 | | | X | | not possible |
| 5 | | | | X | not possible |
| 6 | X | X | | | not possible |
| 7 | X | | X | | the block has exactly 2 colors in it (OK) |
| 8 | X | | | X | not possible |
| 9 | | X | X | | not possible |
| 10 | | X | | X | not possible |
| 11 | | | X | X | not possible |
| 12 | X | X | X | | potential for under-detection |
| 13 | X | X | | X | not possible |
| 14 | X | | X | X | potential for under-detection |
| 15 | | X | X | X | not possible |
| 16 | X | X | X | X | 4 colors are detected (OK) |

Fig. 8

|   | Grp A | | Grp B | | |
|---|---|---|---|---|---|
|   | Gp1 | Gp2 | Gp3 | Gp4 | |
| 1 |   |   |   |   | not possible    Since the original 16x2 block is not empty |
| 2 | X |   |   |   | the block has exactly 1 color in it (OK) |
| 3 | ○↔X |   |   |   | not possible |
| 4 | ○ | X |   |   | not possible    Group A cannot be empty |
| 5 | ○ | ○↔X |   |   | not possible    Group A cannot be empty |
| 6 | X | X↔○ |   |   | not possible    If the block has two colors, one of them must be in group B |
| 7 | X |   | X |   | the block has exactly 2 colors in it (OK) |
| 8 | X |   | ○↔X |   | not possible |
| 9 | ○↔X | X |   |   | not possible |
| 10 | ○↔X |   | ○↔X |   | not possible |
| 11 | ○ |   | X | X | not possible    Group A cannot be empty |
| 12 | X | X | X |   | potential for under-detection |
| 13 | X | X | ○↔X |   | not possible |
| 14 | X |   | X | X | potential for under-detection |
| 15 | ○↔X |   | X | X | not possible |
| 16 | X | X | X | X | 4 colors are detected (OK) |

Fig. 9

| 1000 | 0 | 400 | 200 | 1000 | 0 | 400 | 200 |
|------|---|-----|-----|------|---|-----|-----|
| 200 | 1000 | 0 | 400 | 200 | 1000 | 0 | 400 |

Original Block

Thresholds:
$t = 400$
$t_A = 200$
$t_B = 1000$

Fig. 11

| 1008 | 0 | 400 | 192 | 1008 | 0 | 400 | 192 |
|------|---|-----|-----|------|---|-----|-----|
| 192 | 1008 | 0 | 400 | 192 | 1008 | 0 | 400 |

Original Block

Thresholds:
$t = 400$
$t_A = 197$
$t_B = 1008$

Fig. 12

Original Method:
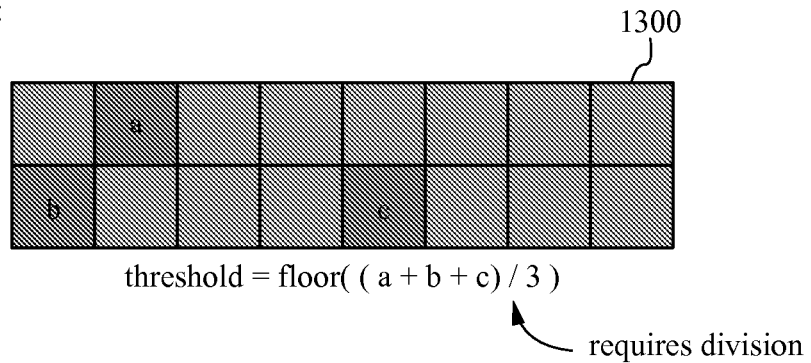
threshold = floor( ( a + b + c ) / 3 )
— requires division
Simplified Method:
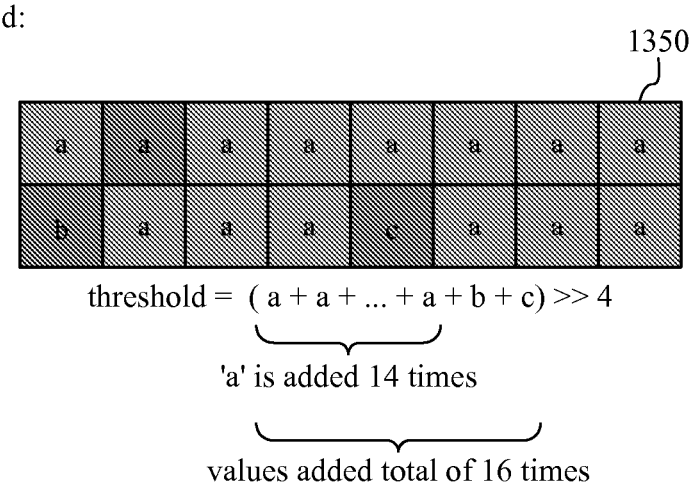
threshold = ( a + a + ... + a + b + c ) >> 4
'a' is added 14 times
values added total of 16 times
Fig. 13

METHOD OF COMPRESSION OF IMAGES USING A NATURAL MODE AND A GRAPHICS MODE

FIELD OF THE INVENTION

The present invention relates to the field of image processing. More specifically, the present invention relates to image compression.

BACKGROUND OF THE INVENTION

For certain applications, conventional image compression systems suffer from a number of problems. These systems are not random access, they have high complexity, and they cannot compress many types of synthetic contents efficiently.

SUMMARY OF THE INVENTION

A method of and system for compression of images and video, with random access capability are described herein. Before encoding, the image is partitioned into blocks. The pixels in each block are coded in one of two modes: a natural mode or a graphics mode. A natural mode is able to be a random access compression method designed for natural content. This, for example, is able to be the method described in the U.S. patent application Ser. No. 12/789,010, titled, "An Image Compression Method with Random Access Capability," which is hereby incorporated by reference in its entirety for all purposes, in which a pulse code modulation (PCM) mode and a differential pulse code modulation (DPCM) mode were used. In the graphics mode, the pixels in each block are grouped into a few groups using thresholds, such that all the pixels in each group are decoded to a single value at the decoder.

In one aspect, a method of compression programmed in a controller of a device comprises partitioning an image into one or more blocks and encoding the one or more blocks using a natural mode or a 4-color graphics mode. The method further comprises acquiring the image. The method further comprises selecting between the natural mode and the 4-color graphics mode. In some embodiments, selecting between the natural mode and the 4-color graphics mode is based on the maximum error. In some embodiments, selecting between the natural mode and the 4-color graphics mode is based on the sum of absolute differences. The graphics mode includes computing a first threshold, grouping sample values less than or equal to the first threshold in a first primary group and grouping the sample values greater than the first threshold in a second primary group. The graphics mode includes computing a second threshold and a third threshold, grouping the sample values in the first primary group less than or equal to the second threshold in a first secondary group, grouping the sample values in the first primary group greater than the second threshold in a second secondary group, grouping the sample values in the second primary group less than or equal to the third threshold in a third secondary group and grouping the sample values in the second primary group greater than the third threshold in a fourth secondary group. If the second secondary group is non-empty and the fourth secondary group is empty, then the first secondary group is split with a first split result remaining in the first secondary group and a second split result going to the fourth secondary group, if the fourth secondary group is still empty, then the second secondary group is split with the first split result remaining in the second secondary group and the second split result going to the fourth secondary group, else if the second secondary group is empty and the fourth secondary group is non-empty, then the third secondary group is split with the first split result remaining in the third secondary group and the second split result going to the second secondary group and if the second secondary group is still empty, then the fourth secondary group is split with the first split result remaining in the fourth secondary group and the second split result going to the second secondary group. A representative color of each of the first secondary group, the second secondary group, the third secondary group and the fourth secondary group is based on a first sample in the respective group. A representative color of each of the first secondary group, the second secondary group, the third secondary group and the fourth secondary group is based on an average of the samples in the respective group. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television or a home entertainment system.

In another aspect, a system for image compression programmed in a controller in a device comprises a partitioning module configured for partitioning an image into one or more blocks and an encoding module configured for encoding the one or more blocks using a natural mode or a 4-color graphics mode. The system further comprises an acquisition module configured for acquiring the image. The system further comprises a selection module configured for selecting between the natural mode and the 4-color graphics mode. In some embodiments, selecting between the natural mode and the 4-color graphics mode is based on the maximum error. In some embodiments, selecting between the natural mode and the 4-color graphics mode is based on the sum of absolute differences. The graphics mode includes: computing a first threshold, grouping sample values less than or equal to the first threshold in a first primary group and grouping the sample values greater than the first threshold in a second primary group. The graphics mode includes: computing a second threshold and a third threshold, grouping the sample values in the first primary group less than or equal to the second threshold in a first secondary group, grouping the sample values in the first primary group greater than the second threshold in a second secondary group, grouping the sample values in the second primary group less than or equal to the third threshold in a third secondary group and grouping the sample values in the second primary group greater than the third threshold in a fourth secondary group. If the second secondary group is non-empty and the fourth secondary group is empty, then the first secondary group is split with a first split result remaining in the first secondary group and a second split result going to the fourth secondary group, if the fourth secondary group is still empty, then the second secondary group is split with the first split result remaining in the second secondary group and the second split result going to the fourth secondary group, else if the second secondary group is empty and the fourth secondary group is non-empty, then the third secondary group is split with the first split result remaining in the third secondary group and the second split result going to the second secondary group and if the second secondary group is still empty, then the fourth secondary group is split with the first split result remaining in the fourth secondary group and the second split result going to the second secondary group. A representative color of each of the first secondary group, the second secondary group, the third secondary group and the fourth secondary group is based on a first sample in the respective group. A representative color of each of the first secondary group, the second secondary group, the third secondary group and the fourth secondary group is based on an average of the samples in the respective group. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television or a home entertainment system.

In another aspect, a camera device comprises a video acquisition component for acquiring a video, a memory for storing an application, the application for: partitioning an image into one or more blocks, selecting between a natural mode or a 4-color graphics mode and encoding the one or more blocks using the natural mode or the 4-color graphics mode and a processing component coupled to the memory, the processing component configured for processing the application. In some embodiments, selecting between the natural mode and the 4-color graphics mode is based on the maximum error. In some embodiments, selecting between the natural mode and the 4-color graphics mode is based on the sum of absolute differences. The graphics mode includes: computing a first threshold, grouping sample values less than or equal to the first threshold in a first primary group and grouping the sample values greater than the first threshold in a second primary group. The graphics mode includes: computing a second threshold and a third threshold, grouping the sample values in the first primary group less than or equal to the second threshold in a first secondary group, grouping the sample values in the first primary group greater than the second threshold in a second secondary group, grouping the sample values in the second primary group less than or equal to the third threshold in a third secondary group and grouping the sample values in the second primary group greater than the third threshold in a fourth secondary group. If the second secondary group is non-empty and the fourth secondary group is empty, then the first secondary group is split with a first split result remaining in the first secondary group and a second split result going to the fourth secondary group, if the fourth secondary group is still empty, then the second secondary group is split with the first split result remaining in the second secondary group and the second split result going to the fourth secondary group, else if the second secondary group is empty and the fourth secondary group is non-empty, then the third secondary group is split with the first split result remaining in the third secondary group and the second split result going to the second secondary group and if the second secondary group is still empty, then the fourth secondary group is split with the first split result remaining in the fourth secondary group and the second split result going to the second secondary group. A representative color of each of the first secondary group, the second secondary group, the third secondary group and the fourth secondary group is based on a first sample in the respective group. A representative color of each of the first secondary group, the second secondary group, the third secondary group and the fourth secondary group is based on an average of the samples in the respective group.

BRIEF DESCRIPTION OF THE DRAWINGS

FIG. 7 shows a table of combinations of non-empty groups, where an 'x' indicates that a group is not empty.

FIG. 8 illustrates a table of combinations of non-empty groups, with explanations of each of the combinations.

FIG. 9 illustrates a table of combinations of non-empty groups with reasons for the impossible cases.

FIG. 11 illustrates a block for generating an artificial 4-color image according to some embodiments.

FIG. 12 illustrates a block for generating an artificial 4-color image according to some embodiments.

FIG. 13 illustrates an example of when a group has three members with a, b and c, and how the representative value for this group can be computed using division by 3 in the original method, and how it can be computed by repeating the first sample and using division by 16 instead, in the simplified method.

DETAILED DESCRIPTION OF THE PREFERRED EMBODIMENT

A method of and system for compression of images and video, with random access capability are described herein. Before encoding, the image is partitioned into blocks. The examples shown herein are for 8×2 blocks, although any block size is possible. The color components (e.g., R, G, B) are separated and compressed independently of each other.

For a 16-sample block, using separate coding of color components, the average value of the 16 sample values is computed:

$$\text{Threshold} = (X_1 + X_2 + \ldots + X_{16} + 8) >> 4$$

A group is generated where the group is made up of all the samples less than or equal to the threshold. Another group is generated for the rest of the sample. The group to which the first sample of the block belongs is called group 1, and the other group is group 2.

The bitstream is generated:

If all of the samples belong to group 1 (e.g., if all block samples are equal), then send '0' and send the value of the first sample. If group 2 also has some members, send '1', send the value of the first sample in group 1, send the value of the last sample in group 2, and for each sample (except the first sample), send '0' if the sample is in group 1 and send '1' if the sample is in group 2.

Figure 1:
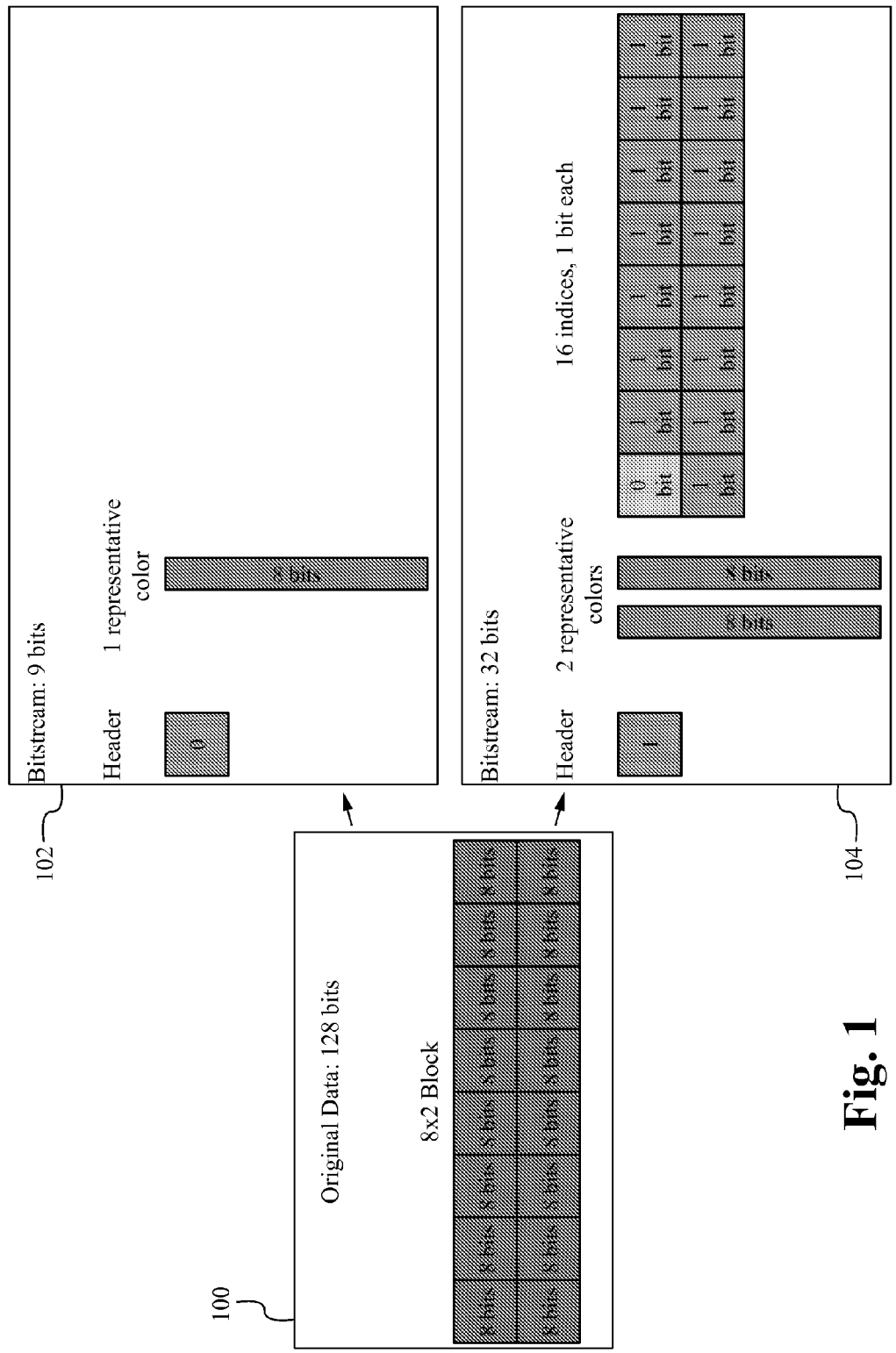
FIG. 1 illustrates a bitstream for the graphics mode according to some embodiments.

FIG. 1 illustrates a bitstream for the graphics mode according to some embodiments. The bitstream depends on whether one color or two colors are determined in original data 100 (e.g., 128 bits in an 8×2 block). If one color is determined, then a nine bit bitstream 102 is utilized with a header '0'. If two colors are determined, then a 32-bit bitstream 104 is utilized with a header '1'.

Figure 2:
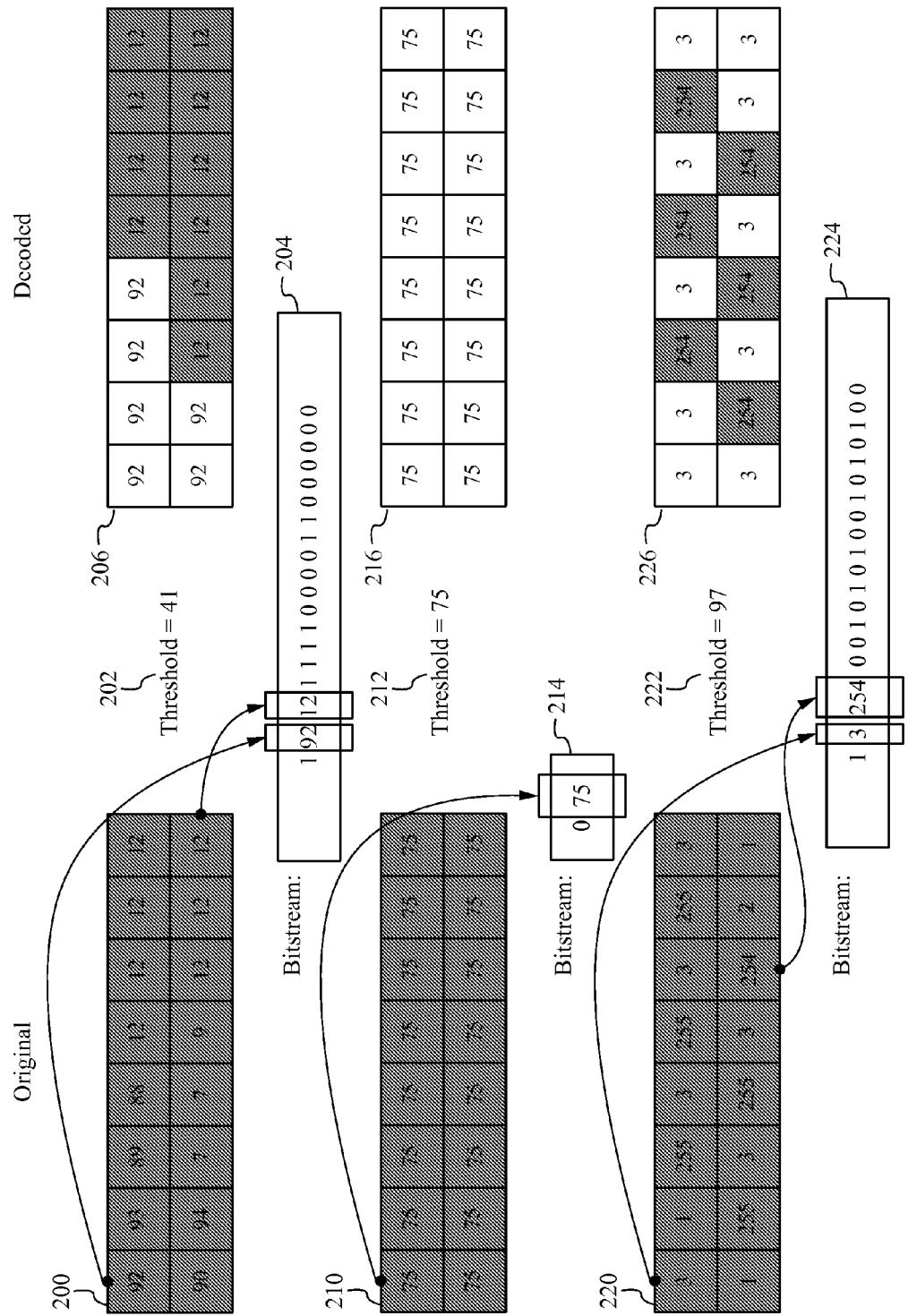
FIG. 2 illustrates examples of original blocks of data, bitstreams and decoded blocks of data according to some embodiments.

FIG. 2 illustrates examples of original blocks of data, bitstreams and decoded blocks of data according to some embodiments. An original block 200 includes the data shown including a first value in group 1 which is 92 and a last value in group 2 which is 12. A threshold 202 is calculated by determining the average of the samples. The bitstream 204 includes a '1' and then the value of the first sample in group 1 and the value of the last sample in group 2. The decoded block 206 is shown.

Another original block 210 includes all of the same value, 75. Therefore, the threshold 212 is 75. The bitstream 214 includes a '0' and then the value 75. The decoded block includes all of the same value, 75.

Another original block 220 includes the data shown including a first value in group 1 which is 3 and a last value in group 2 which is 254. A threshold 222 is calculated by determining the average of the samples. The bitstream 224 includes a '1' and then the value of the first sample in group 1 and the value of the last sample in group 2. The decoded block 226 is shown.

Figure 3:
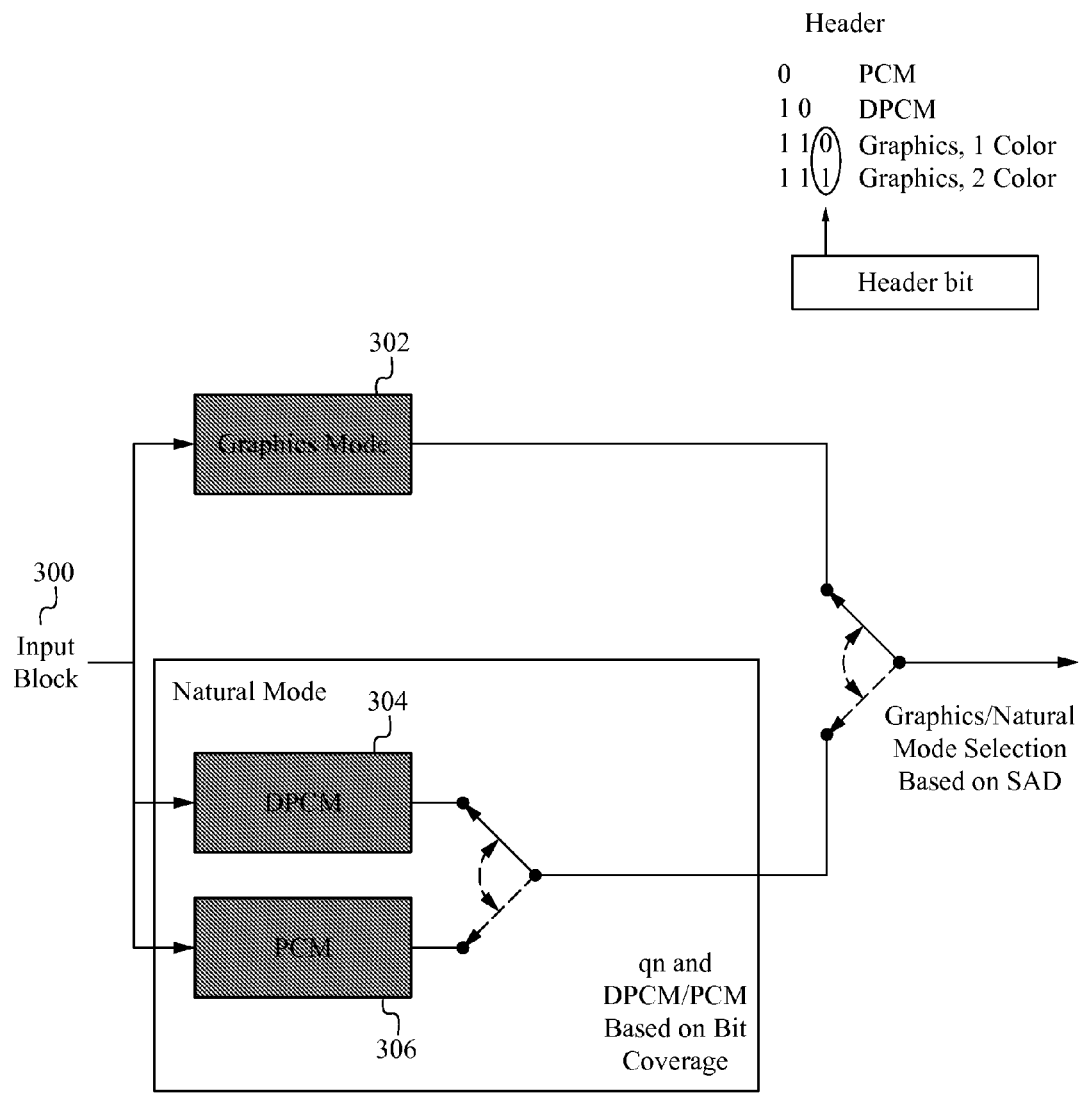
FIG. 3 illustrates a diagram of mode decision and a full header according to some embodiments.

FIG. 3 illustrates a diagram of mode decision and a full header according to some embodiments. An input block 300 goes to graphics mode 302 and the natural modes, DPCM 304 and PCM 306. The DPCM and PCM mode selection is based on bit coverage. Then, a graphics/natural mode selection is based on the Sum of Absolute Differences (SAD). The header is '0' for PCM, '1 0' for DPCM, '1 1 0' for Graphics-1 color and '1 1 1' for Graphics-2 colors.

For the decision between natural and graphics modes, the maximum error is used instead of SAD.

Using the Falkor codec, any sample less than or equal to the threshold is a member of one group and the rest of the samples are members of the second group. Previously, Threshold=round(mean(block samples)). In the modified codec, Threshold=floor(mean(block samples)). The updated threshold is used in the Falkor codec because it guarantees lossless compression for the 1-color cases.

In some embodiments, the criteria for mode decision between graphics and natural modes is changed from SAD to maximum absolute error value. The change guarantees that the maximum absolute error value for the codec in any block is never larger than that of the natural mode.

Figure 4:
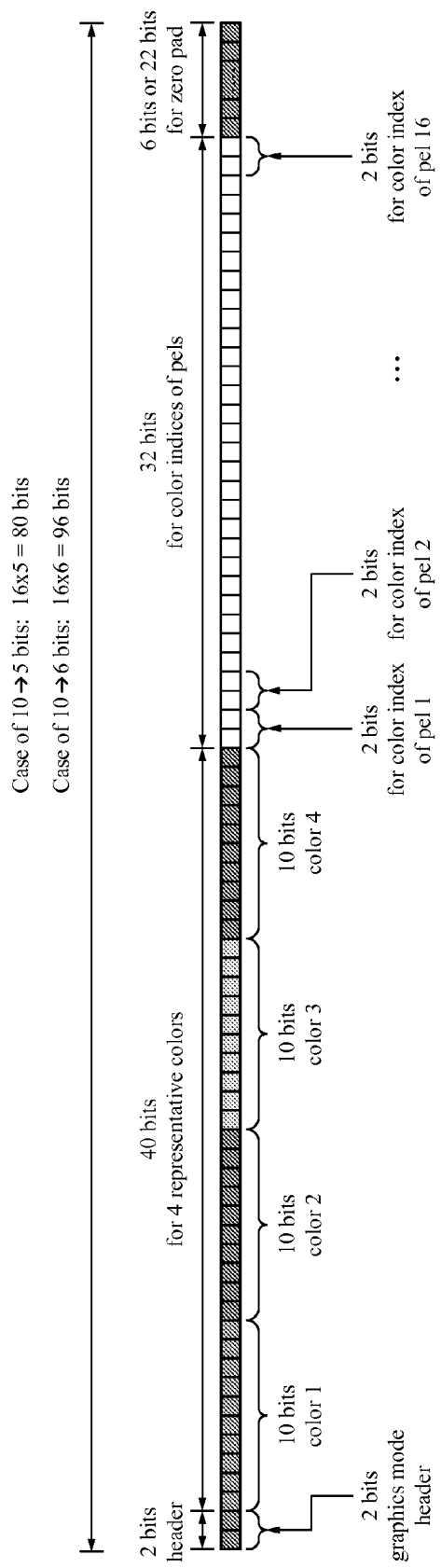
FIG. 4 illustrates the syntax for the 4-color graphics mode, for each of the three color components according to some embodiments.

In some embodiments, the 2-color graphics mode in the codec is replaced with a 4-color graphics mode. The syntax for the 4-color graphics mode, for each of the three color components is shown in FIG. 4. The 1-color graphics mode is not present any more. Color index of the first pel is also sent which reduces complexity and does not negatively affect quality.

For the encoder of the 4-color graphics mode, the representative colors for each color component are found:

A threshold t is computed as: t=floor(mean(all the 16 samples in the block)). All of the sample values less than or equal to t are set to belong to group A. All sample values (if any) greater than t, are set to belong to group B. For members of group A, the following operations are performed:

$t_A$ is computed as: $t_A$=floor(mean(all samples in group A));
All sample values less than or equal to $t_A$ are set to belong to group 1;
All sample values greater than $t_A$ are set to belong to group 2.

For members of group B, the following operations are performed:

$t_B$ is computed as: $t_B$=floor(mean(all samples in group B));
All sample values less than or equal to $t_B$ are set to belong to group 3;
All sample values greater than $t_B$ are set to belong to group 4.

Figure 5:
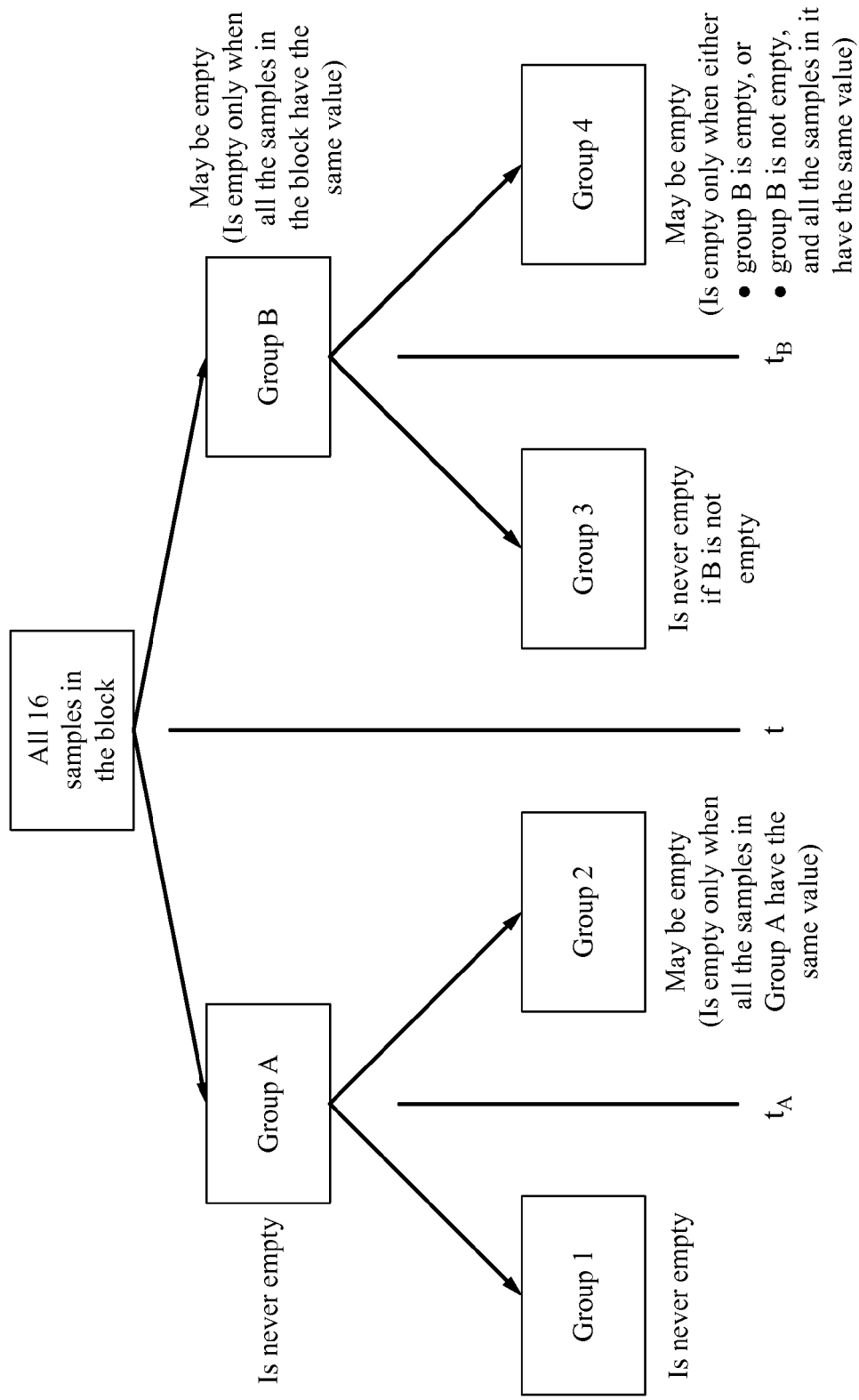
FIG. 5 illustrates a diagram of relationships between the groups, and which groups may be empty according to some embodiments.

FIG. 5 illustrates a diagram of which groups may be empty according to some embodiments.

For any of groups 1 to 4: if the group is empty, then its representative color is set to the dummy value of 0 (or another value), and if the group is not empty, then its representative color is the color of the first sample (in raster scan order) in that group. Even though the first sample is used herein, any other sample in the group is able to be used.

Figure 6:
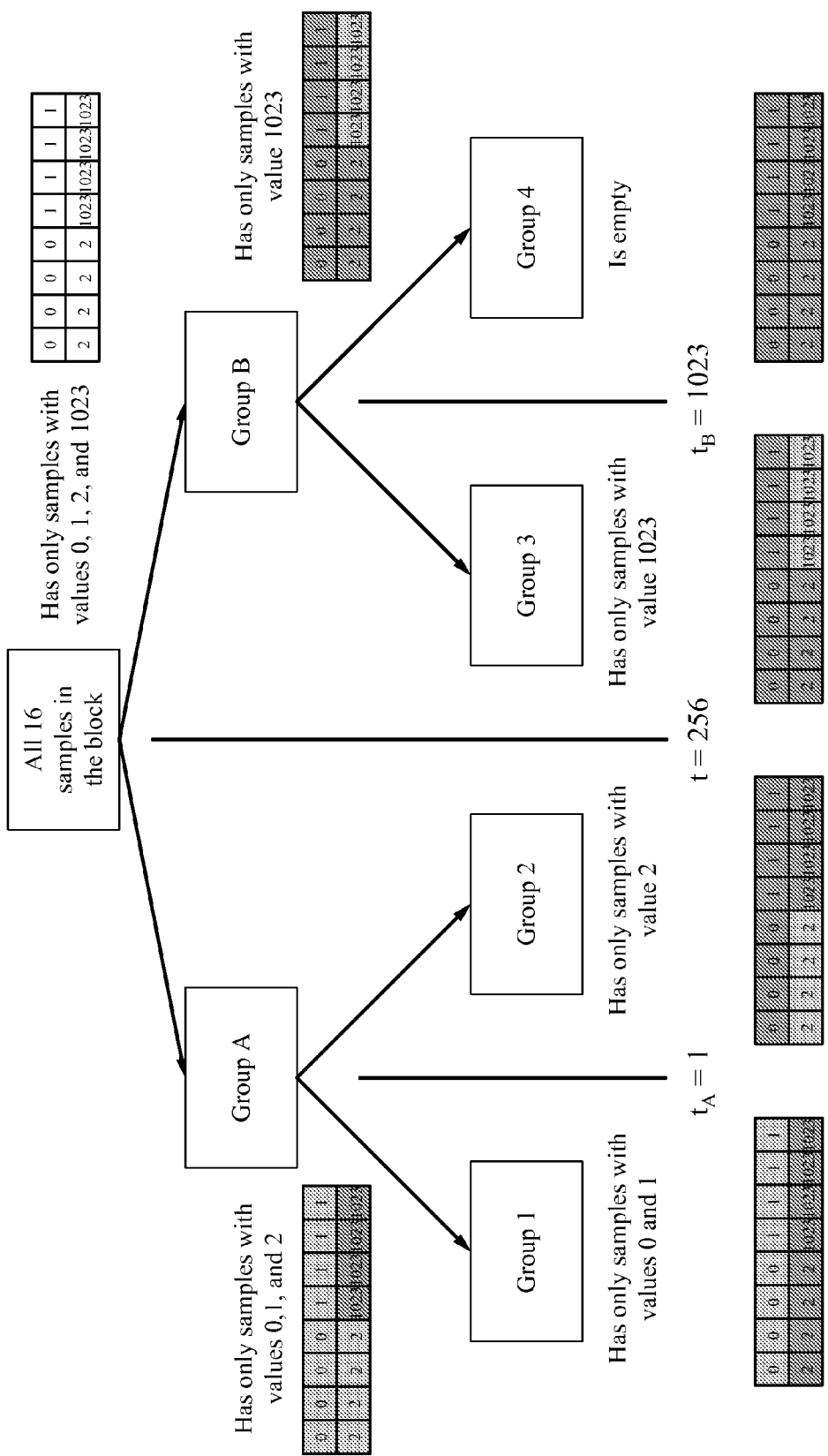
FIG. 6 illustrates an example of three representative colors for a block with four colors according to some embodiments.

Due to the simplicity of the grouping method, in some cases, the graphics mode groups block samples into 3 colors even though there are 4 or more colors in the block. This happens when during partitioning the blocks are grouped into groups A and B, only one of the four colors in the block is above the threshold t. An example is shown in FIG. 6.

In some embodiments, the 2-color graphics mode is replaced with the 4-color graphics mode for compression from 10 bits to 5 bits. Criteria for selection between natural and Graphics mode is maximum absolute value of error. In the previous sections, in certain cases, the 4-color graphics mode may detect only 3 representative colors even when 4 (or more) colors exist in the block, to which is referred as "under-detection."

In the graphics mode, the splitting of any group into two groups is performed as follows: if the original group is not empty, a threshold is computed for the original group: threshold=floor(mean(all samples in the original group)), all sample values less than or equal to the threshold constitute the first group, all sample values greater than the threshold constitute the second group; otherwise, when the original group is empty, the first and second group are also empty. For the basic splitting method, it is easy to verify the following properties: if the original group is not empty, the first group is never empty, and the second group is able to be empty, but this is able to happen only if the original block had only one color.

Based on the basic properties of the group splitting method, the 4-color graphics mode is analyzed to determine which combinations of groups 1 to 4 are able to be non-empty.

FIG. 7 shows a table of combinations of non-empty groups, where an 'x' indicates that a group is not empty. FIG. 8 illustrates a table of combinations of non-empty groups, with explanations of each of the combinations. FIG. 9 illustrates a table of combinations of non-empty groups with reasons for the impossible cases. Case 12 and case 14 have the potential for under-detection. In case 12, since group 4 is empty, then group 3 must have exactly one color in it. To resolve under-detection, the encoder is able to try to split groups 1 and 2. If any of them generates a new non-empty group, put this new group in group 4. In case 14, since group 2 is empty, then group 1 must have exactly one color in it. To resolve under-detection, the encoder is able to try to split groups 3 and 4. If any of them generates a new non-empty group, put this new group in group 2.

Figure 10:
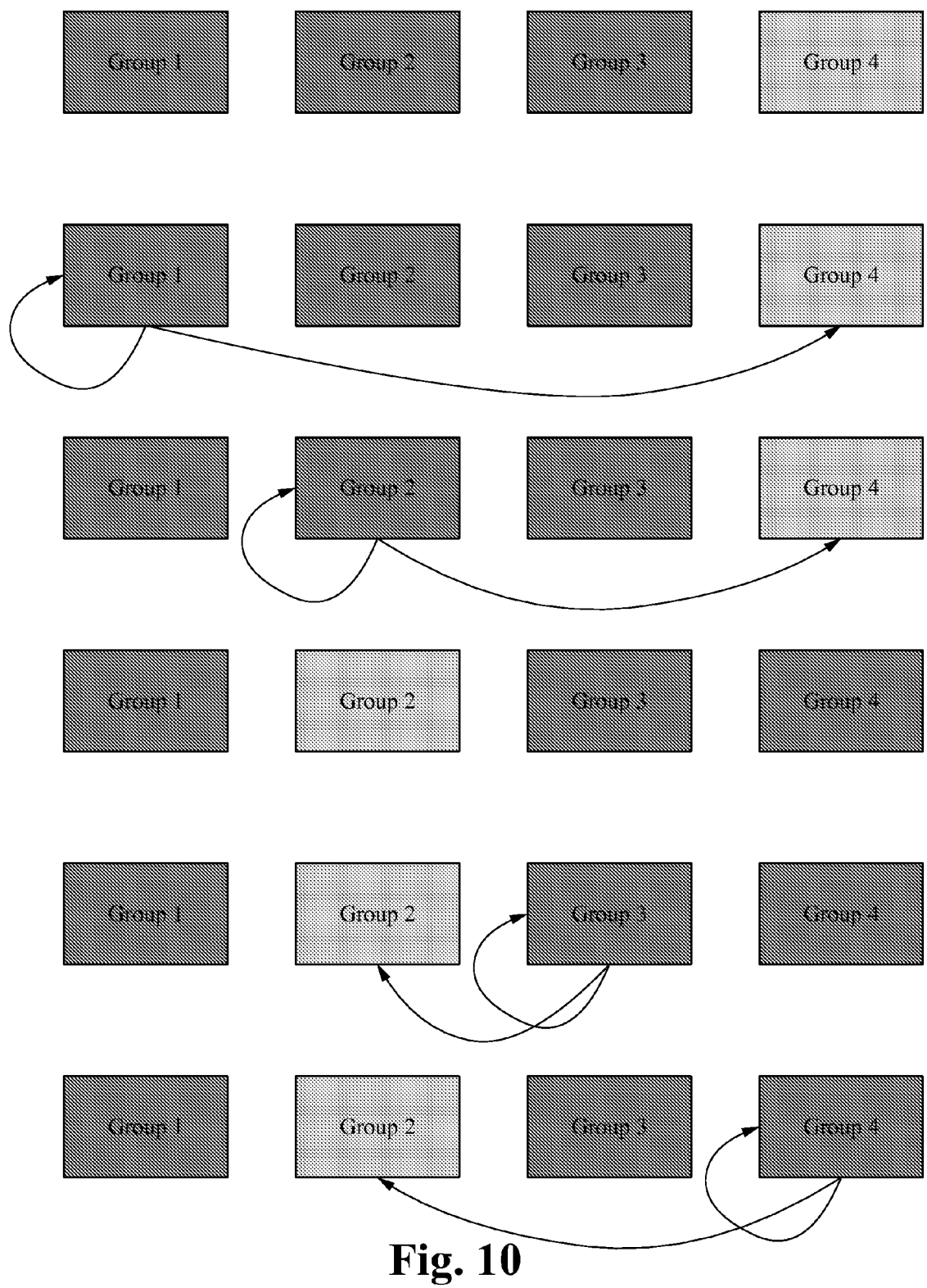
FIG. 10 illustrates a diagram of a revision of the four groups according to some embodiments.

After the original 4-color graphics mode grouping is performed, the following extra steps are taken as the "revision of the groups." If group 2 is non-empty and group 4 is empty, then split group 1 by putting the first resulting group as group 1 and the second resulting group as group 4. If group 4 is still empty, then split group 2 by putting the first resulting group as group 2 and the second resulting group as group 4. Else, if group 2 is empty and group 4 is non-empty, then split group 3 by putting the first resulting group as group 3 and the second resulting group as group 2. If group 2 is still empty, then split group 4 by putting the first resulting group as group 4 and the second resulting group as group 2. FIG. 10 illustrates a diagram of a revision of the four groups according to some embodiments. The first row shows the four groups. The second row shows group 1 is split if group 2 is non-empty and group 4 is empty. The third row shows group 2 is split if group 4 is still empty. The fourth row again shows the four groups. The fifth row shows group 3 is split if group 2 is empty and group 4 is non-empty. The sixth row shows group 4 is split if groups 2 is still empty.

The revision of the groups uses at most two extra splittings of the groups. To compare with previous cases, the 2-color graphics mode uses 1 group splitting, 4-color graphics mode uses 3 group splittings and the 4-color graphics mode with groups revision uses 3+ at most 2=at most 5.

To further verify the effectiveness of the revised grouping, an artificial 4-color image (with the four values 0, 200, 400 and 1000 was generated, by repeating the block in FIG. 11 for each of the components R, G and B. Without the revision of the groups, the 4-color graphics mode would detect the following groups:

Group 1: {0, 200} (represented by value 0)
Group 2: 400
Group 3: 1000
Group 4: empty and mode decision selects the PCM mode->PSNR=45.1460 dB With the revision of groups, the 4-color graphics mode detects the following groups:

Group 1: 0
Group 2: 400
Group 3: 1000
Group 4: 200 and mode decision selects the graphics mode->PSNR=Inf dB (lossless)

The test is repeated with a slightly different artificial 4-color image (with the four values 0, 192, 400 and 1008) obtained by repeating the block in FIG. 12 for each of the components R, G and B. Without the revision of the groups, the 4-color graphics mode would detect the following groups:

Group 1: {0, 192} (represented by value 0)
Group 2: 400
Group 3: 1008
Group 4: empty and mode decision selects the PCM mode->PSNR=42.1357 dB With the revision of groups, the 4-color graphics mode detects the following groups:

Group 1: 0
Group 2: 400
Group 3: 1008
Group 4: 192 and mode decision selects the graphics mode->PSNR=Inf dB (lossless)

An average versus a first sample is used as the representative color. In the graphics mode of the current codec, when the groups are specified, then for each group, a representative color is sent. The representative color is set to be the first sample in the group in raster scan order. A more complex method is implemented by using the average of the samples of each group as the representative color, computed as:

representative color=round(mean(the colors in the group))

In the graphics mode of the current codec, the threshold for splitting of the groups is computed as follows:

threshold=floor(mean(all the samples in the group))

Since the size of the non-empty groups can be any number from 1 to 16, the above computation requires division by values ranging from 2 to 16, which is expensive in terms of hardware implementation.

Therefore, a solution is: before computing the average, and for averaging purpose only, the first sample in the group is repeated as many times as needed to make the total number of samples become 16. Then, the sum of the sample values is computed and divided by 16, using right shift by 4 bits. The proposed solution is effectively that of using the weighted average instead of the non-weighted average of the values in the group.

FIG. 13 illustrates an example of when a group has three members with a, b and c. The original method is shown in 1300. The simplified method is shown in 1350. In the simplified method 1350, 'a' is added 14 times to 'b' and 'c' so that the values are added a total of 16 times. The total is then right shifted 4 times. In some embodiments, instead of repeating the first sample, any sample or samples in the group is able to be repeated, as long as, after repetition, the total number of sample is 16, and averaging can be done by right shift by 4 bits.

Figure 14:
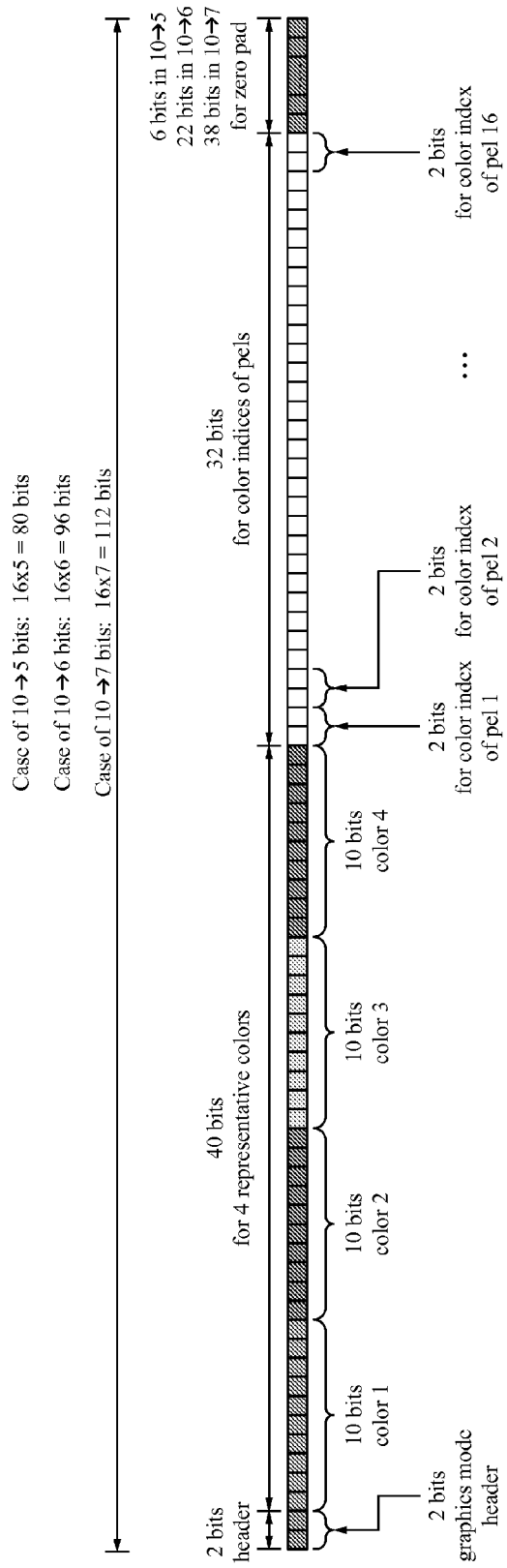
FIG. 14 illustrates 4-color graphics mode syntax according to some embodiments, for compression from 10 bits per sample to 4, 5, and 6 bits per sample.
Figure 15:
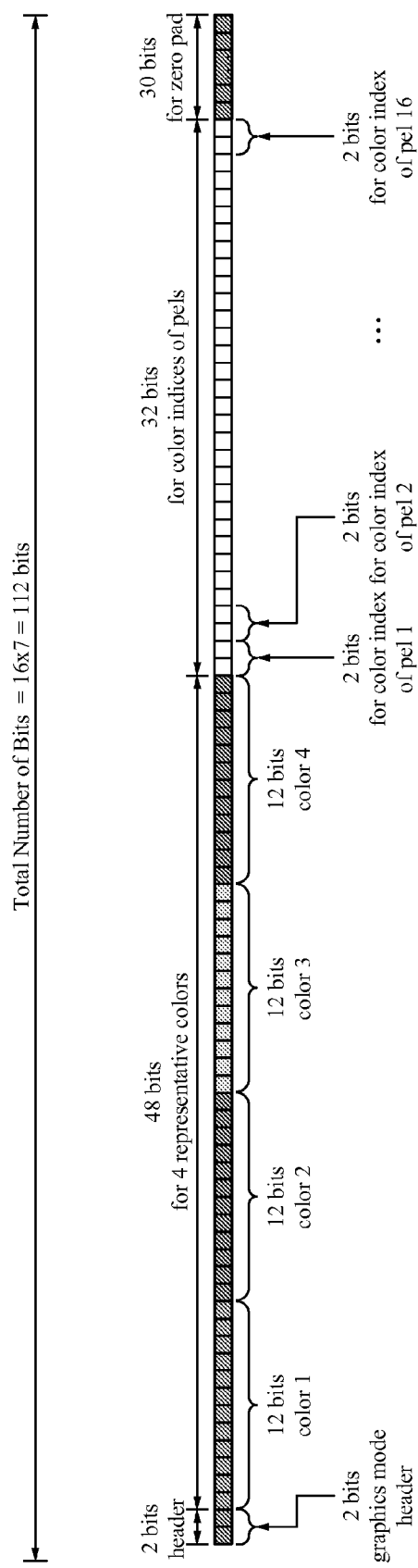
FIG. 15 illustrates 4-color graphics mode syntax according to some embodiments, for compression from 12 bits per sample to 7 bits per sample.

FIGS. 14 and 15 illustrate 4-color graphics mode syntax according to some embodiments.

Figure 16:
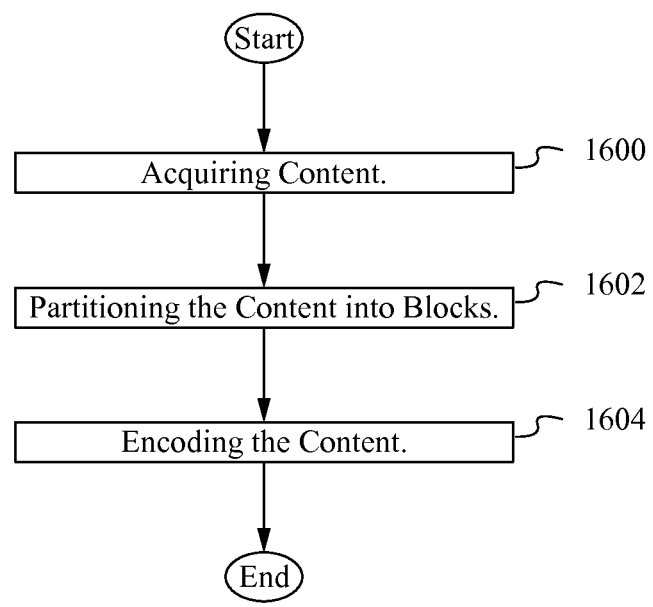
FIG. 16 illustrates a flowchart of a method of compressing images using a natural mode and a graphics mode according to some embodiments.

FIG. 16 illustrates a flowchart of a method of compressing images using a natural mode and a graphics mode according to some embodiments. In the step 1600, content (e.g., an image or a video) is acquired. In the step 1602, the content is partitioned into blocks. In the step 1604, the content is encoded using the natural mode and the graphics mode. In some embodiments, the implementations described herein are implemented to select the natural mode and/or the graphics mode and the implementations of the natural mode and the graphics mode. In some embodiments, fewer or additional steps are implemented. In some embodiments, the order of the steps is able to be modified.

Figure 17:
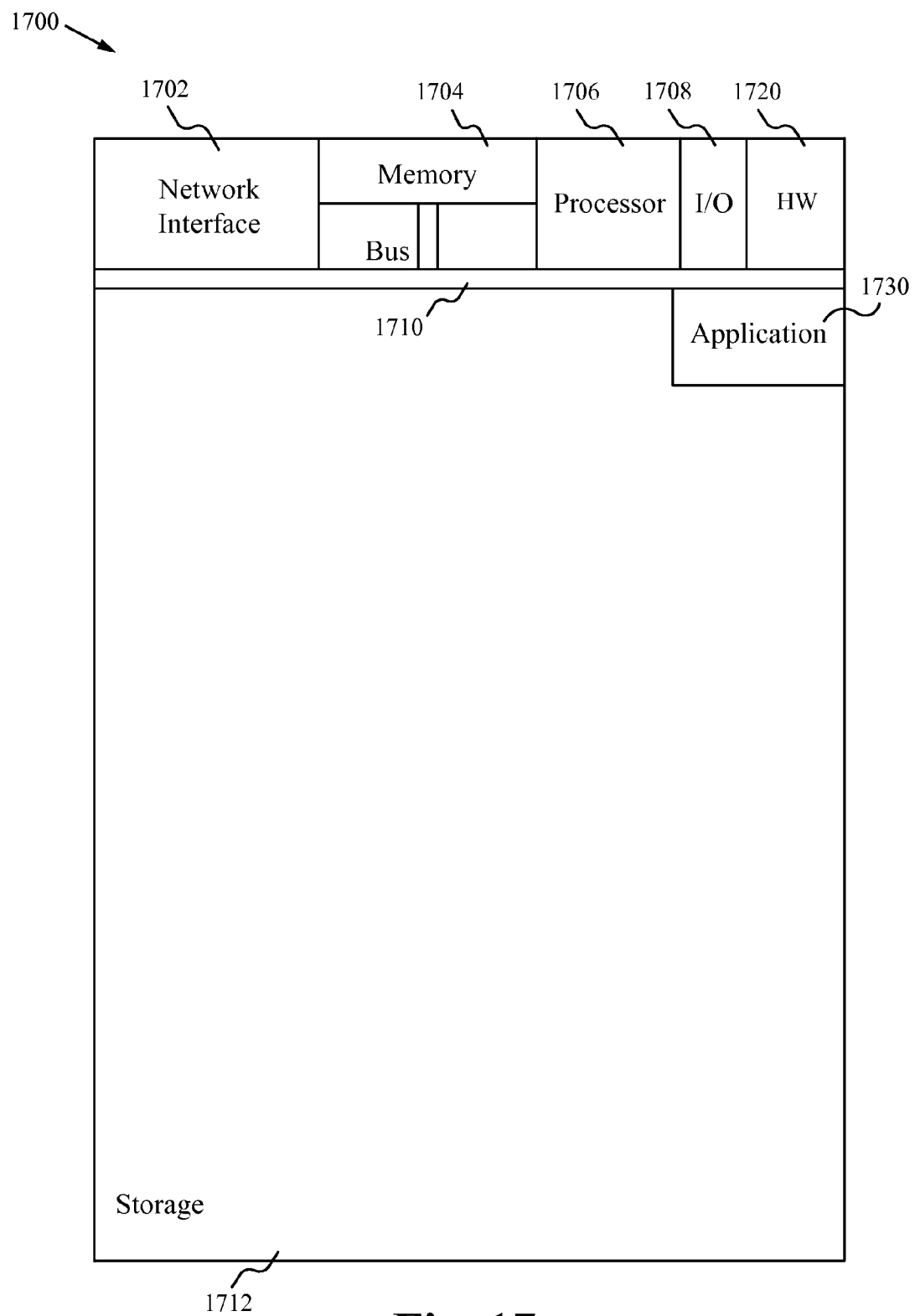
FIG. 17 illustrates a block diagram of an exemplary computing device configured to implement the compression method according to some embodiments.

FIG. 17 illustrates a block diagram of an exemplary computing device 1700 configured to implement the compression method according to some embodiments. The computing device 1700 is able to be used to acquire, store, compute, process, communicate and/or display information such as images and videos. For example, a computing device 1700 is able to acquire and store an image. The compression method is able to be used when acquiring, after acquiring or viewing an image on the device 1700. In general, a hardware structure suitable for implementing the computing device 1700 includes a network interface 1702, a memory 1704, a processor 1706, I/O device(s) 1708, a bus 1710 and a storage device 1712. The choice of processor is not critical as long as a suitable processor with sufficient speed is chosen. The memory 1704 is able to be any conventional computer memory known in the art. The storage device 1712 is able to include a hard drive, CDROM, CDRW, DVD, DVDRW, flash memory card or any other storage device. The computing device 1700 is able to include one or more network interfaces 1702. An example of a network interface includes a network card connected to an Ethernet or other type of LAN. The I/O device(s) 1708 are able to include one or more of the following: keyboard, mouse, monitor, display, printer, modem, touchscreen, button interface and other devices. Compression application(s) 1730 used to perform the compression method are likely to be stored in the storage device 1712 and memory 1704 and processed as applications are typically processed. More or less components shown in FIG. 17 are able to be included in the computing device 1700. In some embodiments, compression hardware 1720 is included. Although the computing device 1700 in FIG. 17 includes applications 1730 and hardware 1720 for compression, the compression method is able to be implemented on a computing device in hardware, firmware, software or any combination thereof. For example, in some embodiments, the compression applications 1730 are programmed in a memory and executed using a processor. In another example, in some embodiments, the compression hardware 1720 is programmed hardware logic including gates specifically designed to implement the compression method.

In some embodiments, the compression application(s) 1730 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, Blu-ray® writer/player), a television, a home entertainment system or any other suitable computing device.

To utilize the compression method, a user acquires a video/image such as on a digital camcorder, and while or after the video is acquired, the compression method automatically compresses the data. The compression method occurs automatically without user involvement.

In operation, the compression method described herein provides image compression with a low hardware cost (e.g. not many logic gates are needed) in some embodiments, low complexity, low delay and very high visual quality (e.g. visually lossless).

Some Embodiments of Method of Compression of Images Using a Natural Mode and a Graphics Mode 1. A method of compression programmed in a controller of a device comprising:
    a. partitioning an image into one or more blocks; and
    b. encoding the one or more blocks using a natural mode or a 4-color graphics mode.
2. The method of clause 1 further comprising acquiring the image.
3. The method of clause 1 further comprising selecting between the natural mode and the 4-color graphics mode.
4. The method of clause 2 wherein selecting between the natural mode and the 4-color graphics mode is based on the maximum error.
5. The method of clause 2 wherein selecting between the natural mode and the 4-color graphics mode is based on the sum of absolute differences.
6. The method of clause 1 wherein the graphics mode includes:
    i. computing a first threshold;
    ii. grouping sample values less than or equal to the first threshold in a first primary group; and
    iii. grouping the sample values greater than the first threshold in a second primary group.
7. The method of clause 6 wherein the graphics mode includes:
    i. computing a second threshold and a third threshold;
    ii. grouping the sample values in the first primary group less than or equal to the second threshold in a first secondary group;
    iii. grouping the sample values in the first primary group greater than the second threshold in a second secondary group;
    iv. grouping the sample values in the second primary group less than or equal to the third threshold in a third secondary group; and
    v. grouping the sample values in the second primary group greater than the third threshold in a fourth secondary group.
8. The method of clause 7 wherein:
    i. if the second secondary group is non-empty and the fourth secondary group is empty, then the first secondary group is split with a first split result remaining in the first secondary group and a second split result going to the fourth secondary group;
    ii. if the fourth secondary group is still empty, then the second secondary group is split with the first split result remaining in the second secondary group and the second split result going to the fourth secondary group;
    iii. else if the second secondary group is empty and the fourth secondary group is non-empty, then the third secondary group is split with the first split result remaining in the third secondary group and the second split result going to the second secondary group; and
    iv. if the second secondary group is still empty, then the fourth secondary group is split with the first split result remaining in the fourth secondary group and the second split result going to the second secondary group.
9. The method of clause 7 wherein a representative color of each of the first secondary group, the second secondary group, the third secondary group and the fourth secondary group is based on a first sample in the respective group.
10. The method of clause 7 wherein a representative color of each of the first secondary group, the second secondary group, the third secondary group and the fourth secondary group is based on an average of the samples in the respective group.
11. The method of clause 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television or a home entertainment system.
12. A system for image compression programmed in a controller in a device comprising:
    a. a partitioning module configured for partitioning an image into one or more blocks; and
    b. an encoding module configured for encoding the one or more blocks using a natural mode or a 4-color graphics mode.
13. The system of clause 12 further comprising an acquisition module configured for acquiring the image.
14. The system of clause 12 further comprising a selection module configured for selecting between the natural mode and the 4-color graphics mode.

15. The system of clause 14 wherein selecting between the natural mode and the 4-color graphics mode is based on the maximum error.
16. The system of clause 14 wherein selecting between the natural mode and the 4-color graphics mode is based on the sum of absolute differences.
17. The system of clause 12 wherein the graphics mode includes:
   i. computing a first threshold;
   ii. grouping sample values less than or equal to the first threshold in a first primary group; and
   iii. grouping the sample values greater than the first threshold in a second primary group.
18. The system of clause 17 wherein the graphics mode includes:
   i. computing a second threshold and a third threshold;
   ii. grouping the sample values in the first primary group less than or equal to the second threshold in a first secondary group;
   iii. grouping the sample values in the first primary group greater than the second threshold in a second secondary group;
   iv. grouping the sample values in the second primary group less than or equal to the third threshold in a third secondary group; and
   v. grouping the sample values in the second primary group greater than the third threshold in a fourth secondary group.
19. The system of clause 18 wherein:
   i. if the second secondary group is non-empty and the fourth secondary group is empty, then the first secondary group is split with a first split result remaining in the first secondary group and a second split result going to the fourth secondary group;
   ii. if the fourth secondary group is still empty, then the second secondary group is split with the first split result remaining in the second secondary group and the second split result going to the fourth secondary group;
   iii. else if the second secondary group is empty and the fourth secondary group is non-empty, then the third secondary group is split with the first split result remaining in the third secondary group and the second split result going to the second secondary group; and
   iv. if the second secondary group is still empty, then the fourth secondary group is split with the first split result remaining in the fourth secondary group and the second split result going to the second secondary group.
20. The system of clause 18 wherein a representative color of each of the first secondary group, the second secondary group, the third secondary group and the fourth secondary group is based on a first sample in the respective group.
21. The system of clause 18 wherein a representative color of each of the first secondary group, the second secondary group, the third secondary group and the fourth secondary group is based on an average of the samples in the respective group.
22. The system of clause 12 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television or a home entertainment system.
23. A camera device comprising:
   a. a video acquisition component for acquiring a video;
   b. a memory for storing an application, the application for:
      i. partitioning an image into one or more blocks;
      ii. selecting between a natural mode or a 4-color graphics mode; and
      iii. encoding the one or more blocks using the natural mode or the 4-color graphics mode; and
   c. a processing component coupled to the memory, the processing component configured for processing the application.
24. The camera device of clause 23 wherein selecting between the natural mode and the 4-color graphics mode is based on the maximum error.
25. The camera device of clause 23 wherein selecting between the natural mode and the 4-color graphics mode is based on the sum of absolute differences.
26. The camera device of clause 23 wherein the graphics mode includes:
   i. computing a first threshold;
   ii. grouping sample values less than or equal to the first threshold in a first primary group; and
   iii. grouping the sample values greater than the first threshold in a second primary group.
27. The camera device of clause 26 wherein the graphics mode includes:
   i. computing a second threshold and a third threshold;
   ii. grouping the sample values in the first primary group less than or equal to the second threshold in a first secondary group;
   iii. grouping the sample values in the first primary group greater than the second threshold in a second secondary group;
   iv. grouping the sample values in the second primary group less than or equal to the third threshold in a third secondary group; and
   v. grouping the sample values in the second primary group greater than the third threshold in a fourth secondary group.
28. The camera device of clause 27 wherein:
   i. if the second secondary group is non-empty and the fourth secondary group is empty, then the first secondary group is split with a first split result remaining in the first secondary group and a second split result going to the fourth secondary group;
   ii. if the fourth secondary group is still empty, then the second secondary group is split with the first split result remaining in the second secondary group and the second split result going to the fourth secondary group;
   iii. else if the second secondary group is empty and the fourth secondary group is non-empty, then the third secondary group is split with the first split result remaining in the third secondary group and the second split result going to the second secondary group; and
   iv. if the second secondary group is still empty, then the fourth secondary group is split with the first split result remaining in the fourth secondary group and the second split result going to the second secondary group.
29. The camera device of clause 27 wherein a representative color of each of the first secondary group, the second secondary group, the third secondary group and the fourth secondary group is based on a first sample in the respective group.
30. The camera device of clause 29 wherein a representative color of each of the first secondary group, the second secondary group, the third secondary group and the fourth secondary group is based on an average of the samples in the respective group.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of compression programmed in a controller of a device comprising:
   a. partitioning an image into one or more blocks; and
   b. encoding the one or more blocks using a natural mode or a 4-color graphics mode, wherein the graphics mode includes:
      i. computing a first threshold;
      ii. grouping sample values less than or equal to the first threshold in a first primary group;
      iii. grouping the sample values greater than the first threshold in a second primary group;
      iv. computing a second threshold and a third threshold;
      v. grouping the sample values in the first primary group less than or equal to the second threshold in a first secondary group;
      vi. grouping the sample values in the first primary group greater than the second threshold in a second secondary group;
      vii. grouping the sample values in the second primary group less than or equal to the third threshold in a third secondary group; and
      viii. grouping the sample values in the second primary group greater than the third threshold in a fourth secondary group.

2. The method of claim 1 further comprising acquiring the image.

3. The method of claim 1 further comprising selecting between the natural mode and the 4-color graphics mode.

4. The method of claim 2 wherein selecting between the natural mode and the 4-color graphics mode is based on the maximum error.

5. The method of claim 2 wherein selecting between the natural mode and the 4-color graphics mode is based on the sum of absolute differences.

6. The method of claim 1 wherein:
   i. if the second secondary group is non-empty and the fourth secondary group is empty, then the first secondary group is split with a first split result remaining in the first secondary group and a second split result going to the fourth secondary group;
   ii. if the fourth secondary group is still empty, then the second secondary group is split with the first split result remaining in the second secondary group and the second split result going to the fourth secondary group;
   iii. else if the second secondary group is empty and the fourth secondary group is non-empty, then the third secondary group is split with the first split result remaining in the third secondary group and the second split result going to the second secondary group; and
   iv. if the second secondary group is still empty, then the fourth secondary group is split with the first split result remaining in the fourth secondary group and the second split result going to the second secondary group.

7. The method of claim 1 wherein a representative color of each of the first secondary group, the second secondary group, the third secondary group and the fourth secondary group is based on a first sample in the respective group.

8. The method of claim 1 wherein a representative color of each of the first secondary group, the second secondary group, the third secondary group and the fourth secondary group is based on an average of the samples in the respective group.

9. The method of claim 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television or a home entertainment system.

10. A system for image compression programmed in a controller in a device comprising:
    a. a partitioning module configured for partitioning an image into one or more blocks; and
    b. an encoding module configured for encoding the one or more blocks using a natural mode or a 4-color graphics mode, wherein the graphics mode includes:
       i. computing a first threshold;
       ii. grouping sample values less than or equal to the first threshold in a first primary group;
       iii. grouping the sample values greater than the first threshold in a second primary group;
       iv. computing a second threshold and a third threshold;
       v. grouping the sample values in the first primary group less than or equal to the second threshold in a first secondary group;
       vi. grouping the sample values in the first primary group greater than the second threshold in a second secondary group;
       vii. grouping the sample values in the second primary group less than or equal to the third threshold in a third secondary group; and
       viii. grouping the sample values in the second primary group greater than the third threshold in a fourth secondary group.

11. The system of claim 10 further comprising an acquisition module configured for acquiring the image.

12. The system of claim 10 further comprising a selection module configured for selecting between the natural mode and the 4-color graphics mode.

13. The system of claim 12 wherein selecting between the natural mode and the 4-color graphics mode is based on the maximum error.

14. The system of claim 12 wherein selecting between the natural mode and the 4-color graphics mode is based on the sum of absolute differences.

15. The system of claim 10 wherein:
    i. if the second secondary group is non-empty and the fourth secondary group is empty, then the first secondary group is split with a first split result remaining in the first secondary group and a second split result going to the fourth secondary group;
    ii. if the fourth secondary group is still empty, then the second secondary group is split with the first split result remaining in the second secondary group and the second split result going to the fourth secondary group;
    iii. else if the second secondary group is empty and the fourth secondary group is non-empty, then the third secondary group is split with the first split result remaining in the third secondary group and the second split result going to the second secondary group; and iv. if the second secondary group is still empty, then the fourth secondary group is split with the first split result remaining in the fourth secondary group and the second split result going to the second secondary group.

16. The system of claim 10 wherein a representative color of each of the first secondary group, the second secondary group, the third secondary group and the fourth secondary group is based on a first sample in the respective group.

17. The system of claim 10 wherein a representative color of each of the first secondary group, the second secondary group, the third secondary group and the fourth secondary group is based on an average of the samples in the respective group.

18. The system of claim 10 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a television or a home entertainment system.

19. A camera device comprising:
   a. a video acquisition component for acquiring a video;
   b. a memory for storing an application, the application for:
      i. partitioning an image into one or more blocks;
      ii. selecting between a natural mode or a 4-color graphics mode; and
      iii. encoding the one or more blocks using the natural mode or the 4-color graphics mode, wherein the graphics mode includes:
      iv. computing a first threshold;
      v. grouping sample values less than or equal to the first threshold in a first primary group;
      vi. grouping the sample values greater than the first threshold in a second primary group;
      vii. computing a second threshold and a third threshold;
      viii. grouping the sample values in the first primary group less than or equal to the second threshold in a first secondary group;
      ix. grouping the sample values in the first primary group greater than the second threshold in a second secondary group;
      x. grouping the sample values in the second primary group less than or equal to the third threshold in a third secondary group; and
      xi. grouping the sample values in the second primary group greater than the third threshold in a fourth secondary group; and
   c. a processing component coupled to the memory, the processing component configured for processing the application.

20. The camera device of claim 19 wherein selecting between the natural mode and the 4-color graphics mode is based on the maximum error.

21. The camera device of claim 19 wherein selecting between the natural mode and the 4-color graphics mode is based on the sum of absolute differences.

22. The camera device of claim 19 wherein:
   i. if the second secondary group is non-empty and the fourth secondary group is empty, then the first secondary group is split with a first split result remaining in the first secondary group and a second split result going to the fourth secondary group;
   ii. if the fourth secondary group is still empty, then the second secondary group is split with the first split result remaining in the second secondary group and the second split result going to the fourth secondary group;
   iii. else if the second secondary group is empty and the fourth secondary group is non-empty, then the third secondary group is split with the first split result remaining in the third secondary group and the second split result going to the second secondary group; and
   iv. if the second secondary group is still empty, then the fourth secondary group is split with the first split result remaining in the fourth secondary group and the second split result going to the second secondary group.

23. The camera device of claim 19 wherein a representative color of each of the first secondary group, the second secondary group, the third secondary group and the fourth secondary group is based on a first sample in the respective group.

24. The camera device of claim 23 wherein a representative color of each of the first secondary group, the second secondary group, the third secondary group and the fourth secondary group is based on an average of the samples in the respective group.

* * * * *